Patented Mar. 11, 1941

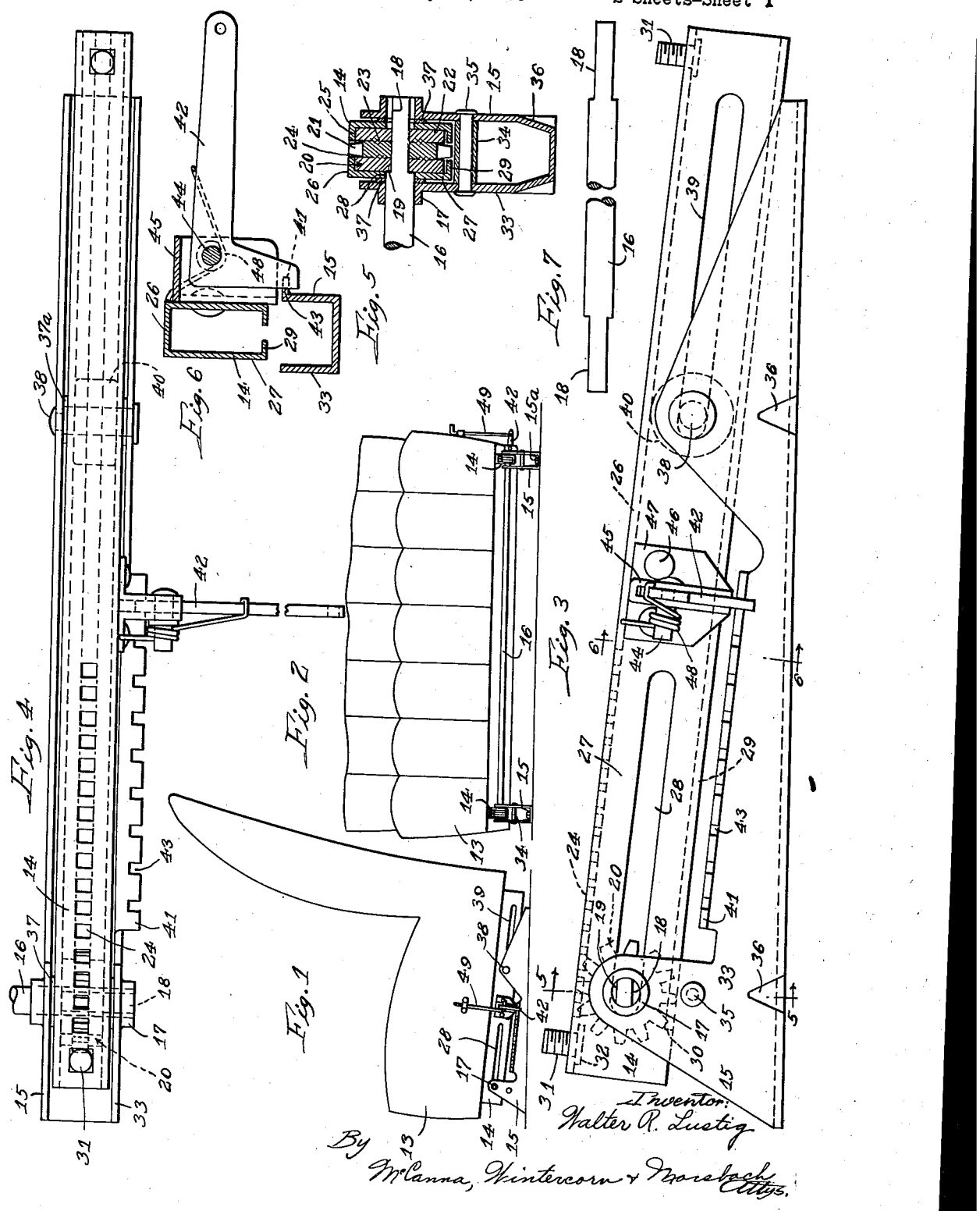

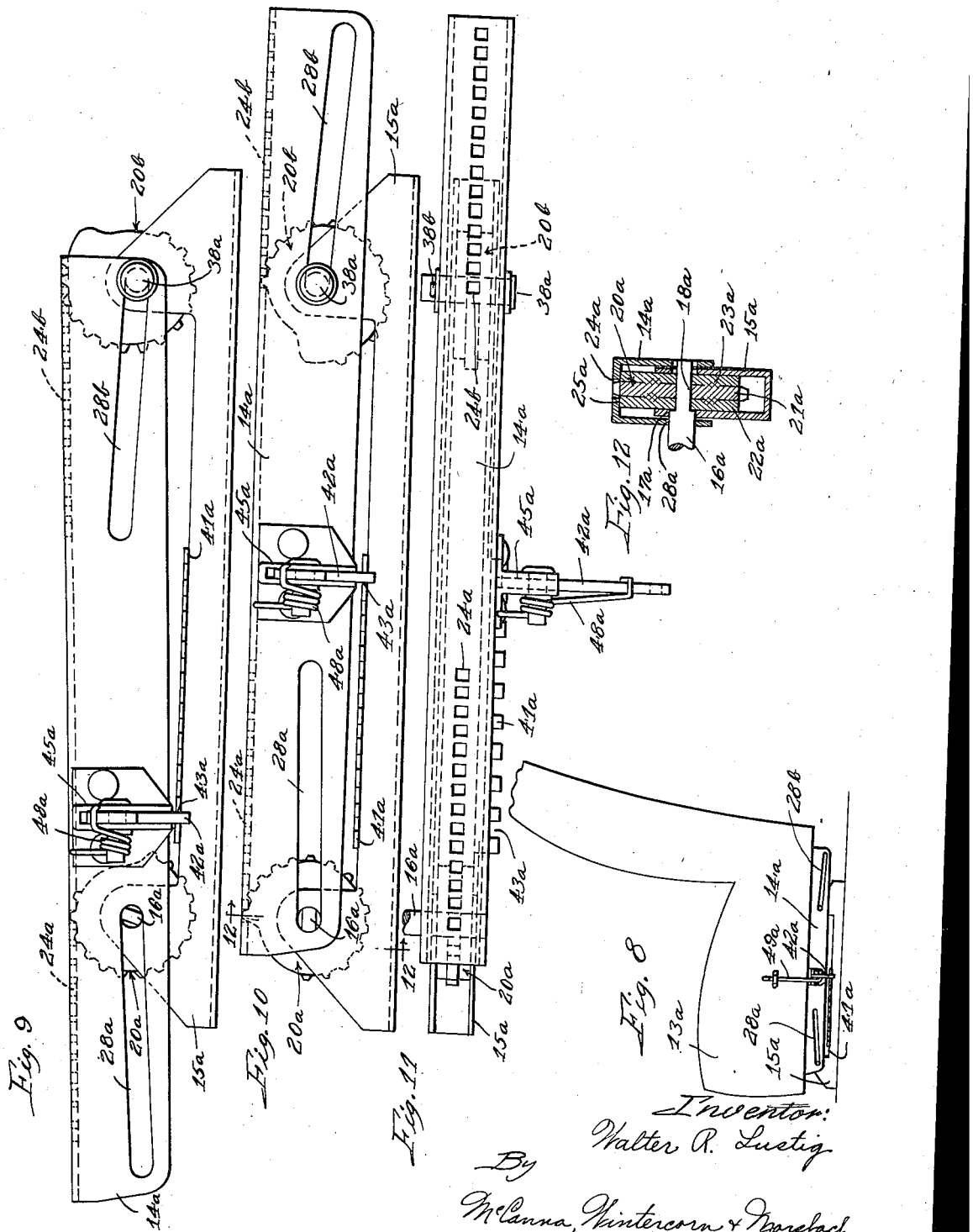

2,234,442

UNITED STATES PATENT OFFICE 2,234,442

ADJUSTABLE SEAT MOUNTING

Walter R. Lustig, Rockford, Ill.

Application July 25, 1938, Serial No. 221,046

15 Claims. (Cl. 155—14)

This invention relates to seats for motor vehicles and has reference to a new and improved adjustable seat mounting.

One of the principal objects of my invention is to provide an adjustable seat mounting in which the two slides at opposite sides of the seat are positively interlocked to move together so that there will be no binding and scraping and one can readily adjust the seat just as easily from either end as from the middle.

Another important object of the invention is the provision of an adjustable seat mounting in which the seat slides and floor brackets are so designed that they may be produced economically from sheet metal and will have the desired strength and rigidity, besides affording good bearing support for the cross-shaft used in connection with the rollers and gears and to assure easy and quiet operation and long service.

Still another important object is the provision of an adjustable seat mounting in which provision is made for a change in the elevation of the seat as it is adjusted back and forth, which is in keeping with the present accepted practice and assures good comfort in any position of adjustment.

The invention is illustrated in the accompanying drawings, in which—

Figure 1 is a side view of an adjustable seat showing a mounting made in accordance with my invention;

Fig. 2 is a front view of Fig. 1, with a portion of the back of the seat broken away to save space;

Fig. 3 is a side view of the adjustable seat mounting on a larger scale, removed from the seat;

Fig. 4 is a plan view of Fig. 3 showing the cross-shaft at the front of the seat mounting broken off and an intermediate portion of the latch broken away to save space;

Figs. 5 and 6 are cross-sections on the correspondingly numbered lines of Fig. 3;

Fig. 7 is an isolated view of the cross-shaft with an intermediate portion thereof broken away to save space;

Fig. 8 is a side view of another adjustable seat showing a mounting of modified or alternative construction like that shown in Figs. 9–12;

Figs. 9 and 10 are side views of the adjustable seat mounting on a larger scale, removed from the seat;

Fig. 11 is a plan view of Fig. 10 showing the cross-shaft broken off, and

Fig. 12 is a cross-section on the line 12—12 of Fig. 10.

Similar reference numerals are applied to corresponding parts throughout the views.

Referring first to Figs. 1–7, the seat shown at 13 has a pair of laterally spaced sheet metal slides 14 fastened to the bottom thereof in laterally spaced parallel relationship and working on a pair of sheet metal brackets 15 suitably secured to the floor of the vehicle. 16 is a cross-shaft received in bearings 17 on the floor brackets 15 at its opposite ends and having flat portions 18 milled on the ends thereof for slip-on driving connections in the correspondingly shaped holes 19 in the combination gear and roller elements 20 working in the seat slides 14. Each of these gear-roller elements is made up of a stamped sheet metal gear 21 on the opposite sides of which are welded round rollers 22 formed by stamped sheet metal washers. The welds are indicated at 23. The gears 21 have their teeth projecting beyond the peripheries of the rollers 22 to mesh in the racks 24 provided on the slides 14 by punching a series of holes therein. Smooth track surfaces 25 are provided on each seat slide on opposite sides of the rack for rolling engagement thereon by the rollers 22. The slides 14 are formed from sheet metal bent to inverted channel-shaped cross-section with the web portion 26 providing the wall in which the rack 24 is punched and on the inner side of which the track surfaces 25 are provided. The parallel side walls 27 are slotted longitudinally, as at 28, to accommodate the end of the shaft 16 in all positions of fore and aft adjustment of the seat slide. The lower edges of the side walls 27 are bent inwardly, as at 29, to provide longitudinal flanges partly for reenforcement and stiffening of the slide. These flanges 29 assume the upward thrust by coming into contact with the rollers 22, when, for example, the driver throws his weight against the back of the seat to move it to the rear when adjusting the same. The broad flat bearing surfaces afforded on these flanges on which the rollers 22 have rolling contact under such conditions eliminates any tendency toward binding of the shaft 16 in the slots 28. The flanges also aid in assembling the seat structure by retaining the gear-roller element 20 against downward displacement up to the time that the flattened end of the shaft 16 is slipped through the gear-roller. The flanges 29 are cut away at the front end of the slide to the point 30 which is far enough inwardly to permit starting the gear teeth in the rack. This is before the stud 31 is inserted; after the stud is inserted its head 32 projects enough on the inner side of the web 26 next to the end of the rack 24 to keep the gear-roller 20 from coming out. There are studs 31 at both ends of the slide for fastening the slide to the bottom of the seat. The floor bracket 15 is formed from sheet metal to channel-shaped cross-section and the side walls 33 thereof are held in fixed spaced relation by a tubular spacer 34 through which a rivet pin 35 is inserted through holes in the side walls 33 and the projecting end upset to hold the pin in place and keep the walls from spreading. The bearings 17 previously mentioned are provided by piercing the opposed side walls 33 and swedging the metal outwardly with a punch to form the elongated bearings shown. The side walls 33 of each floor bracket are dented inwardly on opposite sides as at 36 to provide hollow stiffening ribs. Washers 37 are preferably provided on the shaft 16 on the opposite sides of the slide 14 to keep the slide from rubbing on the side walls 33 of the floor bracket whereby to make for quiet and easier operation.

It should be clear from the description thus far that I have provided an adjustable seat mounting of simple, economical and yet thoroughly practical construction and one which permits quick and easy assembling of the seat in the car on the assembly line. The assembling is simplified because each of the two seat slide and floor bracket assemblies is complete and it only remains for the workman to slip in the flattened ends 18 of the shaft 16 to complete the assembly. The shaft 16 will, of course, be inserted before the seat slides or floor brackets have been secured to the seat or floor, the seat slides being adapted to be secured to the bottom of the seat by means of the studs 31 as previously indicated and the floor brackets 15 being adapted to be secured to the floor of the vehicle by bolts or screws, as indicated at 15a. There is nothing which in the shipment of the structure is apt to drop out and be lost. The gear-roller elements 20 are substantially completely enclosed and will work easily indefinitely on an initial lubrication. The fact that the shaft 16 keys the two gear-roller elements positively to turn together eliminates the familiar difficulty of binding and chattering and enables adjustment of the seat substantially as readily from either end as from the middle.

The rear end of each seat slide 14 is permanently secured to the related floor bracket 15 by a rivet 38 entered through the side walls 33 of the floor bracket, through washers 37a and longitudinal slots 39 in the side walls 27 of the seat slide and through a roller 40 working inside the slide along the inner side of the web 26 as a track. The rollers 40 have substantially the same diameter as the rollers 22 of the gear-roller elements 20.

An outwardly projecting flange 41 is provided by an outwardly bent upper edge of one side wall 33 on one of the floor brackets 15, in a plane parallel with the bottom of the adjacent seat slide 14 and spaced downwardly therefrom, so that a latch 42 pivoted on the side of the slide 14 is adapted to engage selectively in any one of a series of notches 43 provided in longitudinally spaced relation along the flange to lock the seat slide in a selected position of fore and aft adjustment. The latch 42 is pivoted on a pin 44 in a one-piece U-shaped sheet metal bracket 45 riveted or otherwise suitably secured to the side wall 27 of the seat slide, the rivets 46 being entered through ears 47 formed integral with the side walls of the U-shaped bracket. A coiled torsion spring 48 carried on the pin 44 has one end hooked over the latch 42 and the other end abutting the one ear 47 of the bracket 45 and tending normally to urge the latch toward engagement with the flange 41 so as to keep the latch in whichever notch 43 it happens to be entered. A rod 49 slidably mounted on the side of the seat 13 is pivotally connected with the outer end of the latch 42 and permits disengagement of the latch from the notched flange 41 by an upward pull on the rod whenever the seat is to be adjusted forwardly or rearwardly from a given position.

The adjustable seat mounting shown in Figs. 8–12 is generally similar to that just described, the seat slides 14a being of sheet metal construction and channel-shaped cross-section and adapted to be secured by their web portions to the bottom of the seat 13a, and the floor brackets 15a being also of sheet metal construction and channel-shaped cross-section and adapted to be secured to the floor of the vehicle by their web portions. The simultaneous fore and aft adjustment of the companion slides 14a is assured by means of the cross-shaft 16a working in bearings 17a on the floor brackets 15a and having flattened end portions 18a having a slip-on driving connection with gear-roller elements 20a similarly as the shaft 16 connects with the gear-roller elements 20. However, in this adjustable seat mounting each slide 14a has a front gear-roller element 20a cooperating with a rack 24a and a rear gear-roller element 20b cooperating with a rack 24b, the latter gear-roller element being supported on a headed pin 38a which is retained in place by a cotter pin 38b. The gear-roller elements 20a and 20b differ from the gear-roller elements 20 in being scroll shaped, that is, each of these elements is made up of a middle cam gear 21a and opposed cam rollers 22a, the parts being welded together as at 23a. Each of these gear-roller elements functions similarly as the gear roller elements 20 except that the eccentric peripheries of the parts 21a and 22a cause a change in elevation of the rack 24a or 24b as the case may be as the gear-roller element turns, the roller parts 22a being profiled similarly as the gear parts 21a to have constant rolling contact with the track surfaces 25a next to the racks 24a and 24b in the rotation of the gear-roller elements. Slots 28a and 28b at the front and rear ends of the slide receive the ends of the shafts 16a and 16b, respectively, and permit fore and aft adjustment of the slide with respect to the floor bracket. These slots it will be noticed are inclined at an acute angle with respect to one another as required by the fact that the slide assumes positions of different inclination in different positions of adjustment. Thus, as shown in Fig. 10, when the slide 14a is at its rearward limit of adjustment it is substantially horizontal but when it is adjusted to its forward limit as in Fig. 9 the rear end is elevated appreciably with respect to the front end. This is found to give better comfort for a short legged person who requires extreme forward adjustment of the seat. The front gear-element 20a of each of the two seat slides is approximately 270° advanced in relation to the companion gear-roller element 20b, as shown in Fig. 10, with the result that the element 20b reaches its high point when the element 20a reaches its low point and vice versa. It is only due to the fact that the shaft 16b is set at a higher elevation than the shaft 16a that the slide 14a attains the horizontal position shown in Fig. 10 at its rearward limit of adjustment. There is such a slight amount of inclination of the slide 14a in its different positions of adjustment that the latch shown at 42a cooperates properly with all of the notches 43a in the flange 41a in the different positions of adjustment of the seat. This latch 42a is arranged to be operated similarly as the latch 42 by means of a pull rod 49a and is normally held in its locked position by means of a coiled torsion spring 48a. The bracket 45a for mounting the latch 42a is similar to the bracket 45 of the other adjustable seat mounting.

It is believed the foregoing description conveys a good understanding of the objects and advantages of my invention. The appended claims have been drawn with a view to covering all legitimate modifications and adaptations.

I claim:

1. In a longitudinally movable seat, the combination of a fixed floor bracket, a seat-supporting bracket movable relative thereto, said floor bracket being of channel-shaped cross-section and said seat bracket being of inverted channel-shaped cross-section, the floor bracket having upward extensions on the side walls thereof and the seat-supporting bracket fitting therebetween, both brackets having web portions connecting their side walls, means extending upwardly from the web portion of the seat bracket for securing the same to the bottom of a seat, the web portion of the floor bracket being adapted to have means extended downwardly therefrom for securing same to the floor of a vehicle, the side walls of the seat bracket having longitudinal slots provided therein, supports extending transversely between the upward extensions on the side walls of the floor bracket through said longitudinal slots and carrying rollers thereon in raised relation to the web portion of the floor bracket, said rollers rollingly engaging only the bottom surface of the web portion of the seat bracket, and means for releasably securing said seat bracket in longitudinally adjusted relation to the floor bracket.

2. In a longitudinally movable seat, the combination of a pair of laterally spaced substantially parallel floor brackets, a seat-supporting bracket movable relative to each of said floor brackets, said seat-supporting brackets being of inverted channel-shaped cross-section and said floor brackets being of channel-shaped cross-section, upward extensions on the side walls of the floor brackets having the seat brackets fitting therebetween, said brackets having web portions connecting their side walls, means extending upwardly from the web portion of the seat brackets for securing the same to the bottom of a seat, the web portion of the floor brackets being adapted to receive means extending downwardly therefrom for securing the same to the floor of a vehicle, rollers rollingly engaging the bottom surface of the web portion of the seat brackets and having peripherally projecting gear teeth meshing in longitudinally spaced holes provided in said web portions and constituting racks, a cross-shaft extending from one floor bracket to the other and through longitudinal slots provided in the side walls of the seat brackets and supported at its ends in bearings provided in the upward extensions on the side walls of the floor brackets, said shaft being of circular cross-section for low frictional engagement in said bearings but having portions on the ends thereof conformed to provide flat drive surfaces, said conformed end portions being detachably and slidably but drivingly engaged in correspondingly shaped holes provided therefor in the centers of the rollers, and means for releasably securing at least one of said seat brackets in longitudinally adjusted relation to the related floor bracket.

3. In a longitudinally movable seat, the combination of a pair of laterally spaced substantially parallel floor brackets, a seat-supporting bracket movable relative to each of said floor brackets, said seat-supporting brackets being of inverted channel-shaped cross-section and said floor brackets being of channel-shaped cross-section, said seat brackets and floor brackets interfitting so that one is disposed between the side walls of the other and said brackets providing web portions, means extending upwardly from the web portion of the seat brackets for securing the same to the bottom of a seat, the web portion of the floor brackets being adapted to receive means extending downwardly therefrom for securing the same to the floor of a vehicle, rollers rollingly engaging the bottom surface of the web portion of the seat brackets and having peripherally projecting gear teeth meshing in longitudinally spaced holes provided in said web portions and constituting racks, a cross-shaft extending from one floor bracket to the other and through longitudinal slots provided in the side walls of the seat brackets and supported at its ends in bearings provided in the floor brackets, said shaft being of circular cross-section but having portions on the ends thereof cut away to provide flat drive surfaces, said end portions being detachably and slidably but drivingly engaged in correspondingly shaped holes provided therefor in the centers of the rollers, and means for releasably securing at least one of said seat brackets in longitudinally adjusted relation to the related floor bracket, the seat-supporting brackets having an inwardly projecting longitudinal flange on the lower edge of at least one side wall thereof adapted to retain the rollers in meshing engagement with their racks prior to entry therein of the ends of the cross-shaft.

4. In a longitudinally movable seat, the combination of a pair of laterally spaced substantially parallel floor brackets, a seat-supporting bracket movable relative to each of said floor brackets, said seat-supporting brackets being of inverted channel-shaped cross-section and said floor brackets being of channel-shaped cross-section, said seat brackets and floor brackets interfitting so that one is disposed between the side walls of the other and said brackets providing web portions, means extending upwardly from the web portion of the seat brackets for securing the same to the bottom of a seat, the web portion of the floor brackets being adapted to receive means extending downwardly therefrom for securing the same to the floor of a vehicle, rollers rollingly engaging the bottom surface of the web portion of the seat brackets and having peripherally projecting gear teeth meshing in longitudinally spaced holes provided in said web portions and constituting racks, a cross-shaft extending from one floor bracket to the other and through longitudinal slots provided in the side walls of the seat brackets and supported at its ends in bearings provided in the floor brackets, said shaft being of circular cross-section but having portions on the ends thereof cut away to provide flat drive surfaces, said end portions being detachably and slidably but drivingly engaged in correspondingly shaped holes provided therefor in the centers of the rollers, and means for releasably securing at least one of said seat brackets in longitudinally adjusted relation to the related floor bracket, the seat-supporting brackets having an inwardly projecting longitudinal flange on the lower edge of at least one side wall thereof adapted to retain the rollers in meshing engagement with their racks prior to entry therein of the ends of the cross-shaft, the racks terminating in longitudinally spaced relation to the ends of the seat brackets and the flanges terminating in spaced relation to the ends also to permit entering said rollers into the ends of said brackets in meshing engagement with the racks.

5. In a longitudinally movable seat, the combination of a pair of laterally spaced substantially parallel floor brackets, a seat-supporting bracket movable relative to each of said floor brackets, said seat-supporting brackets being of inverted channel-shaped cross-section and said floor brackets being of channel-shaped cross-section, said seat brackets and floor brackets interfitting so that one is disposed between the side walls of the other and said brackets providing web portions, means extending upwardly from the web portion of the seat brackets for securing the same to the bottom of a seat, the web portion of the floor brackets being adapted to receive means extending downwardly therefrom for securing the same to the floor of a vehicle, rollers rollingly engaging the bottom surface of the web portion of the seat brackets and having peripherally projecting gear teeth meshing in longitudinally spaced holes provided in said web portions and constituting racks, a cross-shaft extending from one floor bracket to the other and through longitudinal slots provided in the side walls of the seat brackets and supported at its ends in bearings provided in the floor brackets, said shaft being of circular cross-section but having portions on the ends thereof cut away to provide flat drive surfaces, said end portions being detachably and slidably but drivingly engaged in correspondingly shaped holes provided therefor in the centers of the rollers, and means for releasably securing at least one of said seat brackets in longitudinally adjusted relation to the related floor bracket, the seat-supporting brackets having an inwardly projecting longitudinal flange on the lower edge of at least one side wall thereof adapted to retain the rollers in meshing engagement with their racks prior to entry therein of the ends of the cross-shaft, the racks terminating in longitudinally spaced relation to the ends of the seat brackets and the flanges terminating in spaced relation to the ends also to permit entering said rollers into the ends of said brackets in meshing engagement with the racks, and the means extending upwardly from the web portion of the brackets for securing the same to the bottom of a seat including fastening elements, one for each of said seat brackets, which when applied to the ends of the brackets subsequent to the entry of the rollers therein retain said rollers against removal from the ends of said brackets.

6. As an article of manufacture, a combination roller and gear for a slidable seat mounting, comprising a middle gear and opposed flat disks disposed in concentric relation with the gear, the disks having a diameter less than the gear diameter so as to provide annular shoulders alongside the teeth thereof, and a shaft having a cylindrical end machined off on the side to provide an elongated flat drive surface thereon next to a locating shoulder and said gear and disks being secured together and having registering center holes provided therein conformed to fit closely and non-rotatably on the machined end of said shaft in abutment with the shoulder.

7. In a longitudinally movable seat, the combination of a pair of laterally spaced substantially parallel floor brackets, a seat-supporting bracket movable relative to each of said floor brackets, said seat-supporting brackets being of inverted channel-shaped cross-section and said floor brackets being of channel-shaped cross-section, upward extensions on the side walls of the floor brackets at the front and rear ends thereof having the seat brackets fitting therebetween, said brackets having web portions connecting their side walls, means extending upwardly from the web portion of the seat brackets for securing the same to the bottom of a seat, the web portion of the floor brackets being adapted to receive means extending downwardly therefrom for securing the same to the floor of a vehicle, rollers rotatably mounted on transverse supports extending between the one set of upward extensions on side walls of the floor brackets through longitudinal slots provided in the side walls of the seat brackets, the rollers rollingly engaging the bottom surface of the web portion of the seat brackets, other rollers rollingly engaging the bottom surface of the web portion of the seat brackets at the other end thereof and having peripherally projecting gear teeth meshing in longitudinally spaced holes provided in said web portions and constituting racks, a cross-shaft extending from one floor bracket to the other and through longitudinal slots provided in the side walls of the seat brackets and supported at its ends in bearings provided in the other set of upward extensions on the side walls of the floor brackets, said shaft being of circular cross-section for low frictional engagement in said bearings but having side portions on the ends thereof conformed to provide flat drive surfaces, said conformed end portions being detachably and slidably but drivingly engaged in correspondingly shaped holes provided therefor in the centers of the last named rollers, and means for releasably securing at least one of said seat brackets in longitudinally adjusted relation to the related floor bracket.

8. In a longitudinally movable seat, the combination of a floor bracket, a seat bracket movable longitudinally relative thereto, and a pair of cam-shaped gear-rollers rotatably supported transversely on one of said brackets in fore and aft spaced relationship and having rolling contact with track surfaces rigid with the other of said brackets and also meshing engagement with racks rigid therewith, said gear rollers having the peripheries thereof conformed to approximate spirals, one of said gear-rollers being angularly offset in relation to the other so as to cause one end of said track to be elevated more and more relative to the other end the more the seat bracket is adjusted in one direction.

9. Means for slidably supporting a seat or the like comprising a stationary supporting channel having upwardly extending flanges having registering holes provided therein, a relatively movable channel having downwardly extending flanges fitting between the first flanges and having an inwardly projecting lower edge portion on at least one of same, said downwardly extending flanges also having longitudinal slots provided therein, an anti-friction roller element fitting between the downwardly extending flanges and adapted to be supported against downward displacement by said inwardly projecting edge portion prior to assembly on its axle element, said roller element being adapted to have rolling engagement only with the movable channel and to be supported in raised relation to the stationary channel, and an axle element for supporting the roller element projecting through said slots provided in the downwardly projecting flanges and received in said registering holes provided in the upwardly projecting flanges.

10. Means for slidably supporting a seat or the like comprising a stationary supporting channel having upwardly extending flanges having registering holes provided therein, a relatively movable channel having downwardly extending flanges fitting between the first flanges and having an inwardly projecting lower edge portion on at least one of same, said downwardly extending flanges also having longitudinal slots provided therein, an anti-friction combined gear and roller element fitting between the downwardly extending flanges and adapted to be supported against downward displacement by said inwardly projecting edge portion prior to assembly on the axle element, said movable channel having the web portion thereof perforated to provide a rack extending lengthwise thereof wherein the gear teeth of said gear-roller element are adapted to mesh when said element rollingly engages said web portion, and an axle element adapted to be detachably connected to said gear-roller element projecting through said slots provided in the downwardly projecting flanges and rotatably received in said registering holes provided in the upwardly projecting flanges.

11. Means for slidably supporting a seat or the like comprising laterally spaced stationary upright supports, a seat-supporting channel having downwardly extending flanges disposed between said supports and having an inwarding projecting lower edge portion on at least one of same, an anti-friction combined gear and roller element fitting between the downwardly extending flanges and adapted to be supported against downward displacement by said inwardly projecting edge portion prior to assembly on its shaft, coaxially aligned bearings provided on said supports, said gear-roller element having a central non-circular opening provided therein adapted to register with said bearings, and a shaft of circular cross-section adapted to operate in said bearings with a working fit for support of the shaft and the gear-roller element and the seat-supporting channel, said shaft having the terminal end portion thereof cut away on at least one side thereof to conform to the non-circular central opening in the gear-roller element for a detachable slidable driving connection therewith, said seat-supporting channel having longitudinal slots provided in the flanges thereof for projection of the shaft therethrough and having the web portion thereof perforated to provide a rack extending lengthwise thereof wherein the gear teeth of the gear-roller element mesh when the latter rollingly engages said web portion.

12. A seat slide structure comprising, in combination, a channel-shaped floor bracket adapted to be secured to the floor by the web portion thereof and having upward extensions on the side walls thereof at the front and rear ends and having an outwardly bent and notched edge portion on one of the side walls between and below the level of said upward extensions, a seat-supporting channel adapted to be secured to the bottom of a seat by the web portion thereof and having the flanges thereof extending downwardly and disposed between the upward extensions of the floor bracket, said flanges having longitudinal slots provided therein at the front and rear ends registering with coaxially aligned bearing openings provided in said upward extensions, a roller element and a gear-roller element in said seat-supporting channel, one in the front portion and the other in the rear portion thereof, said seat-supporting channel having the web portion thereof perforated to provide a rack extending lengthwise thereof for meshing engagement with the teeth of the gear-roller element, said roller element and gear-roller element both rollingly engaging the web portion of said seat-supporting channel, an axle for the roller element mounted in bearings in one pair of upward extensions and projecting through the slots in the adjacent flanges of the seat-supporting channel, a shaft having a driving connection with the gear-roller element and received in the bearings in the other pair of upward extensions and projecting through the slots in the adjacent flanges of the seat-supporting channel, and latch means movable with the seat-supporting channel and detachably engaged in a selected one of the notches in the aforesaid notched edge portion, whereby to hold the seat-supporting channel in adjusted relation to the floor bracket.

13. A seat slide structure as set forth in claim 12, wherein at least one of the flanges of the seat-supporting channel has an inwardly projecting lower edge portion arranged to retain the roller element and gear-roller element against downwardly displacement from said channel prior to assembly thereof on the axle and shaft associated with said roller element and gear-roller element, respectively.

14. A seat slide structure comprising, in combination, laterally spaced stationary upright supports, a seat-supporting channel having downwardly extending flanges disposed between said supports and having an inwardly projecting lower edge portion on at least one of same, a roller element fitting between the downwardly extending flanges and adapted to be supported against downward displacement by said inwardly projecting edge portion prior to assembly on its axle, said supports having coaxially aligned openings provided therein registering with longitudinal slots provided in the flanges of the seat supporting channel, and an axle supporting said roller for rotation received in the openings in said supports and projecting through said slots, the aforesaid inwardly projecting edge portion being arranged to come into engagement with the bottom of the roller element and have rolling contact therewith to limit upward displacement of the seat-supporting channel in the adjustment thereof relative to said supports.

15. A seat slide structure comprising, in combination, front and rear pairs of laterally spaced stationary upright supports, a seat-supporting channel having downwardly extending flanges disposed between said supports and having an inwardly projecting lower edge portion on at least one of same, an anti-friction roller element and an anti-friction combined gear and roller element fitting between the downwardly extending flanges in spaced relation to one another and adapted to be supported against downward displacement by said inwardly projecting edge portion prior to their assembly on an axle and shaft therefor, said supports having coaxially aligned openings provided therein registering with longitudinal slots provided in the flanges of the seat-supporting channel, the web portion of the channel being perforated to provide a longitudinal rack for meshing engagement with the teeth of the gear-roller element, the gear-roller element and the roller element both having rolling contact normally on the web portion of the seat-supporting channel, an axle for rotatably supporting the roller element received in the openings in the associated supports and projecting through the adjacent slots in the seat-supporting channel, a shaft having a working fit in the openings in the other supports and having a driving connection with the gear-roller element and projecting through the other slots in the seat-supporting channel, and means for detachably locking the seat-supporting channel in longitudinally adjusted relation to said upright supports, the aforesaid inwardly projecting edge portion being arranged to have rolling contact with the bottom of the roller element and gear-roller element to prevent upward displacement of the seat-supporting channel relative to said supports in the longitudinal adjustment thereof relative thereto.

WALTER R. LUSTIG.

CERTIFICATE OF CORRECTION.

Patent No. 2,234,442.  March 11, 1941.

WALTER R. LUSTIG.

It is hereby certified that error appears in the printed specification of the above numbered patent requiring correction as follows: Page 3, second column, line 1, claim 2, before "portions" insert --side--; page 5, first column, line 42, claim 11, for "inwarding" read --inwardly--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.